Oct. 13, 1970     C. E. JOHNSON, JR     3,534,256
MAGNETIC SUSCEPTIBILITY MEASURING MEANS UTILIZING A
BRIDGE CIRCUIT WITH ONE ARM HAVING A PAIR OF
FIXED COILS AND A PAIR OF SAMPLE COILS
Filed Sept. 18, 1968
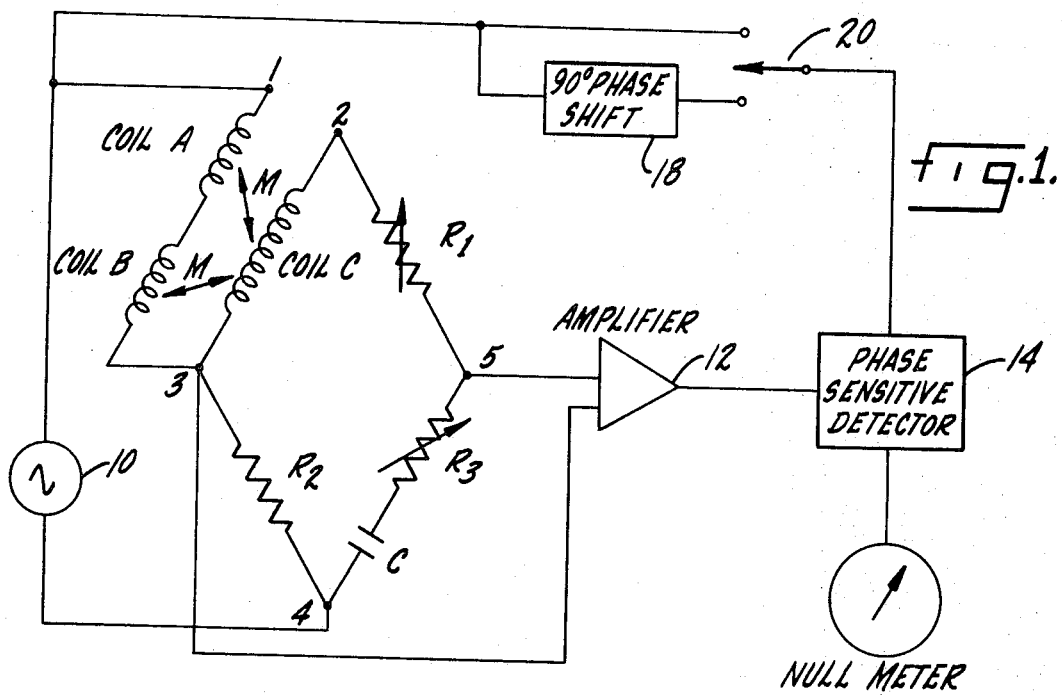
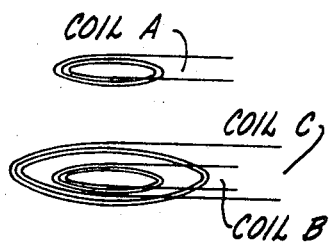
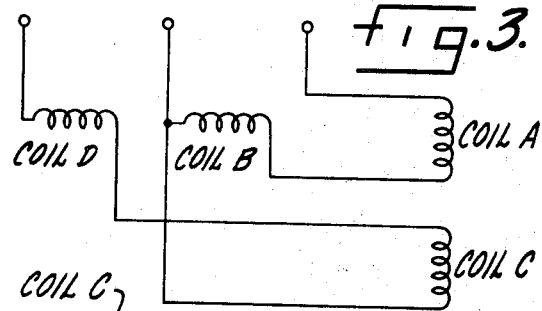
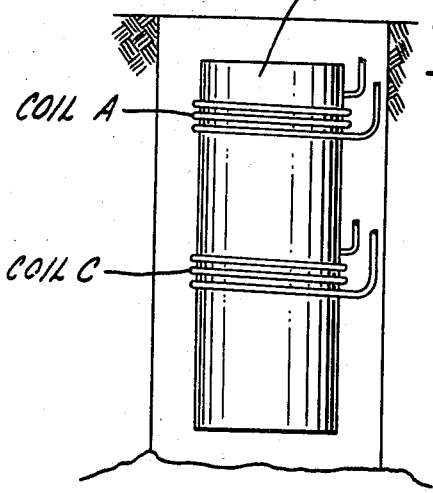
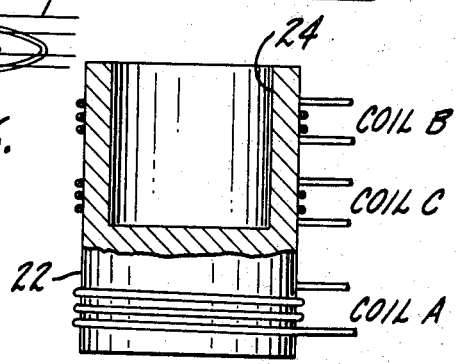
INVENTOR.
Clark E. Johnson, Jr.
BY Parker, Carter & Markey
Attorneys.

United States Patent Office 3,534,256
Patented Oct. 13, 1970

3,534,256
MAGNETIC SUSCEPTIBILITY MEASURING MEANS UTILIZING A BRIDGE CIRCUIT WITH ONE ARM HAVING A PAIR OF FIXED COILS AND A PAIR OF SAMPLE COILS
Clark E. Johnson, Jr., 60 Pinecroft Road, Weston, Mass. 02193
Filed Sept. 18, 1968, Ser. No. 760,531
Int. Cl. G01r 33/00
U.S. Cl. 324—34       4 Claims

ABSTRACT OF THE DISCLOSURE

A bridge circuit for measuring the susceptibility of a geophysical sample which includes a multi-arm bridge having an oscillator input and an output which is connected to a phase sensitive detector. The reactive and resistive portions of the output can be balanced by variable resistances in different arms of the bridge. There is a direct connection from the oscillator to the phase sensitive detector with means for changing the phase of the oscillator signal applied to the phase sensitive detector for use in effecting both a reactive and resistive bridge balance. One arm of the bridge includes a plurality of coils so arranged that the introduction of a sample adjacent said coils changes the mutual inductance between coils and hence provides means for measuring the susceptibility of the sample.

SUMMARY OF THE INVENTION

This invention relates to a bridge circuit for measuring the magnetic susceptibility of a sample, and particularly relates to improved means for balancing resistive and reactive components of the bridge output.

One purpose of the invention is a circuit of the type described including phase sensitive detector means for use in effecting a reactive and resistive bridge balance.

Another purpose is an improved circuit of the type described in which a portion of the input is compared with the output of the bridge circuit for effecting a resistive and reactive bridge balance.

Another purpose is a bridge circuit of the type described including an improved arrangement for the sample measuring coils in which one set of coils is fixed and the other set is movable, to measure samples at different locations.

Other purposes will appear in the ensuing specification, drawings and claims.

BRIEF DESCRIPTION OF THE DRAWINGS

The invention is illustrated diagrammatically in the following drawings wherein:

FIG. 1 is a circuit diagram illustrating the bridge circuit disclosed herein,

FIG. 2 is a diagrammatic illustration of one arrangement of the sample measuring coils, FIG. 3 is a partial circuit diagram illustrating an alternative coil arrangement, FIG. 4 is a diagrammatic illustration of a second coil configuration, FIG. 5 is a diagrammatic illustration of yet a further coil configuration, and FIG. 6 is a diagrammatic illustration of a further coil configuration.

DESCRIPTION OF THE PREFERRED EMBODIMENT

The device disclosed herein finds application in measuring the magnetic susceptibility of materials. The circuit disclosed is particularly suitable for geomagnet measurement on rocks and other materials because of its high sensitivity and also because the reactive and resistive portions of the bridge can be seperately balanced, with only resistive adjustments. Part instruments for the same purpose have used earphones and independent panel adjustments to find a null in the birdge when a sample was introduced between the susceptibility measurement coils. The use of an audio nulling system has disadvantages, especially when used outside in high ambient noise conditions. The circuit disclosed herein has independent balancing of the reactive and resistive currents and makes use of present-day phase detecting techniques to achieve a bridge balance.

In FIG. 1 a four-arm or multi-arm bridge circuit has an oscillator 10 connected across its input which, as shown herein, are terminals 1 and 4. The bridge circuit may include a variable resistor R1 in one arm of the bridge, and a second variable resistor R3 in another arm of the bridge. In series with the resistor R3 is a condenser C. A fixed resistor R2 is in a third arm of the bridge, and the fourth arm of the bridge is formed by coil C. As illustrated in FIG. 1, there are three coils designated as coil A, coil B and coil C. These three coils are connected betwen terminals 1, 3 and 2. The output of the bridge circuit is between terminals 3 and 5.

The output of the bridge circuit is connected to a conventional amplifier 12 of negligible phase shift, with the output from the amplifier being connected to a conventional phase sensitive detector 14. The output from the phase sensitive detector 14 may go to a conventional meter 16 which is arranged to provide a null indication. For example, a high sensitivity meter with a logarithmic response characteristic has been found to be satisfactory. Also connected to the output of the oscillator 10 is a conventional phase shift circuit indicated diagrammatically at 18. A switch 20 is effective to connect either the phase shift circuit which, as shown herein, provides a 90 degree phase shift, or the output of the oscillator directly to the other input of the phase sensitive detector.

The measurement coils are so arranged relative to each other that there is mutual inductance between coils A and C and further mutual inductance between coils B and C. The total mutual inductance of all three coils is equal to the difference between the mutual inductance between coil A and C and the mutual inductance between coil B and C.

The equations for balance of the bridge are as follows where L is the self inductance of coil C and $R_C$ is the resistance of coil C:

$$M = \frac{R_2 L}{R_2 + R_3}$$

and $M = CR_2(R_C + R_1)$. The first equation provides the so-called imaginary or reactive bridge balance and depends solely on R3 for adjustment. The second equation is for the resistive or real bridge balance and depends only upon R1 for adjustment. The real or resistive portion of the bridge balance is related to the conductivity or the resistive losses in the sample, while the reactive portion of the bridge balance depends upon the relative mutual inductance of the coils. The change in mutual inductance which is brought about by introduction of a sample between the coils B and C is directly related to the change in the setting of resistance R3. Introduction of the sample will also cause an unbalance in the real portion of the bridge, and this unbalance can be balanced out simply by readjusting resistance R1. The change in the value of R3 can then be related directly to the susceptibility of the sample and is:

$$k = \Delta R_3 C_1 \frac{1}{1 - \Delta R_3 / C_2}$$

where $C_1$ and $C_2$ are constants depending on the coil geometry and $k$ is the susceptibility of the sample. It should be noted that the balance is independent of oscillator frequency.

In order to simply achieve such a balance, the output from the bridge is fed through the amplifier 12 to a phase sensitive detector. The detector 14 will only provide an output when the two inputs to its circuit are in phase. Accordingly, switch 20 can first be set to the upper position in which the oscillator 10 directly feeds the phase sensitive detector 14. R1 can then be adjusted until the meter 16 gives a null indication. The bridge is then resistively balanced. Switch 20 can then be moved to the lower position in which the signal from the oscillator 10 has its phase changed by 90 degrees. R3 is then adjusted until there is a reactive balance. Because of the impossibility of separating the real and imaginary signals completely, that is, causing their quadrature detection over the wide dynamic range involved, it occasionally may be necessary to move back and forth between resistive balances until both components of the output signal have been balanced out.

When a sample is then positioned relative to the coils so that the mutual inductance between the coils changes, R3 can then be adjusted to a further null point. Since the susceptibility is proportional to $$\frac{1}{1 - \Delta R_3 / C_1}$$

for small values of susceptibility, R3 can be calibrated directly in susceptibility units. For a wide range of R3, however, this is not possible and conversion from the value of R3 to susceptibility must be done by means of a graph or formula.

As illustrated in FIG. 1, the coils are arranged so that there is mutual inductance between coils A and C and between coils B and C. An example of such a physical configuration is illustrated in FIG. 2. Coil B is in one plane, and is substantially larger than coil C, which is in the same plane. Positioned in a plane above the plane of coils B and C is coil A. The coils are generally of the pancake form and are so spaced above the sample that the effect of vertical distance between the plane containing coils B and C and the plane containing coil A minimizes the effect of slight variations in vertical displacement. The introduction of a sample in this manner will vary the mutual inductance between coils B and C. This change in mutual inductance, as described above, provides a susceptibility measurement. The particular configuration of FIG. 2 is diagrammatic, but does illustrate the relative positions of the coils.

FIG. 3 illustrates an alternative coil arrangement for use in the circuit of FIG. 1. Coils A and C are what is known as sample coils in that they may be physically moved about relative to the instrument so as to make measurements at locations spaced from the instrument. Coils A and C and coils B and C, are connected to terminals 1, 2 and 3 in the manner shown in FIG. 3, and these terminals are the same terminals as illustrated in FIG. 1. The so-called fixed coils, coils B and D, are physically a portion of the instrument and are not removed from it. The advantage in the arrangement of FIG. 3 is that the so-called sample coils may be moved about, for example on the end of a long wire to make measurements at remote locations. The total mutual inductance is equal to the difference between the mutual inductances between coils A and C and the mutual inductances between coils B and D. The mutual inductance between coils A and C will be varied by the sample, whereas the mutual inductance between coils B and D remains constant. The self inductance of the circuit in FIG. 3 for use in the above formula is the sum of the self inductances of coils D and C.

FIG. 5 diagrammatically illustrates one use of the coil arrangement illustrated in FIG. 3. Here coils A and C are wound about a slender rod or tube 21 in such a way that the rod or tube may be dropped down into a bore within the earth. In this way, the susceptibility of the various strata surrounding the bore may be measured as the rod or tube holding the coils is moved within the bore.

FIG. 6 illustrates a second use of the coil arrangement of FIG. 3. Coils A and C, of the pancake type, are coaxial and coplanar, as in FIG. 2. Coils B and D are located in the instrument. The sample to be measured is positioned adjacent the pair of coils or the coils are moved to the location of the sample.

FIG. 4 illustrates a further coil arrangement. However, in this case, three coils are used as in the circuit configuration of FIG. 1. Coils B and C are wound about the upper portion of a rod 22 having an opening or cavity 24. Coil A is wound about a solid portion of the rod 24. The sample to be measured would be placed in the cavity or opening 24 so an to vary the mutual inductance between coils B and C.

Because of the different placement of the sample relative to the coils in the configurations of FIGS. 4 and 5, the change in mutual inductance with a particular type of material might vary because in one instance the sample is within the coils and in the other instance the sample is outside of the coils. Nevertheless, the circuit configuration and the manner of computing the mutual inductance will basically remain the same. Again, a change in one resistor can vary the reactive balance of the bridge circuit and a change in a different resistor in a different arm of the bridge can vary the resistive balance of the bridge circuit.

In the circuit arrangement of FIG. 3 the three coils of FIG. 1 have actually been split into four coils, only two of which are used to measure the sample. The other two coils, these being coils B and D, provide a fixed mutual inductance and normally this set of coils will be mounted inside of the instrument. The external or measuring coils all have the same mutual inductance and the same self-inductance, so that all coils are interchangeable and give approximately the same readout on the meter. Thus the use of coils of varying geometry, as long as they have the same mutual inductance and the same self-inductance, can be used interchangeably.

Whereas the preferred form of the invention has been shown and described herein, it should be realized that there are many modifications, substitutions and alterations thereto, within the scope of the following claims.

What is claimed is:

1. In a bridge circuit for measuring susceptibility of a sample, a multi-arm bridge, an oscillator connected to said bridge to provide an input, a bridge output, one arm of said bridge including a pair of fixed coils and a pair of sample coils, said sample coils being movable relative to the bridge and fixed coils to permit measurement of samples at locations remote from the bridge and fixed coils, said coils being so connected together that the total mutual inductance of all coils is equal to the difference between the mutual inductance between the fixed coils and the mutual inductance between the sample coils, means in other arms of said bridge for varying the reactive and resistive bridge output, and phase sensitive means connected to said bridge output and directly to said oscillator for use in effecting a reactive and resistive bridge balance.

2. The circuit of claim 1 further characterized in that said sample coils are coaxial and coplanar.

3. The circuit of claim 1 further characterized in that said sample coils are arranged for insertion of a sample inside of said coils to vary the mutual inductance between them.

4. The circuit of claim 1 further characterized in that said sample coils are arranged for insertion inside of a sample to vary the mutual inductance between said coils.

References Cited

UNITED STATES PATENTS 3,075,145   1/1963   Goldberg et al. ___ 324—34 XR

OTHER REFERENCES

Mekim, Wolf and Phil; Jour. Sci. Inst., February 1957; pp. 64–67.

ALFRED E. SMITH, Primary Examiner

R. J. CORCORAN, Assistant Examiner

U.S. Cl. X.R.

324—13